UNITED STATES PATENT OFFICE.

LUDWIG BEREND, OF AMÖNEBURG-ON-THE-RHINE, GERMANY.

CONDENSATION PRODUCT FROM PHENOLS AND FORMALDEHYDE.

1,214,414.    Specification of Letters Patent.    Patented Jan. 30, 1917.

No Drawing.    Application filed March 19, 1914. Serial No. 825,849.

*To all whom it may concern:*

Be it known that I, LUDWIG BEREND, chemist, citizen of Germany, subject of the King of Prussia and Emperor of Germany, residing at Landgrabenweg 14, Amöneburg-on-the-Rhine, in the Kingdom of Prussia and Empire of Germany, have invented new and useful Improvements in Condensation Products from Phenols and Formaldehyde, of which the following is a specification.

The present invention relates to a method of making artificial resins by condensing phenols with formaldehyde or substances splitting off formaldehyde and consists in condensing a cresol mixture containing meta-cresol with a formaldehyde body in about such a quantity as the quantity of meta-cresol contained in said mixture would call for, expelling the unused cresol from the obtained resin and recovering said cresol.

It is known that by the reaction of crude cresols and formaldehyde a product is obtained which may be used as a substitute for shellac. Hitherto, however, it has not been practically possible to employ such cresol resins as shellac substitutes as the polishes and varnishes made with them always have a very lasting and very disagreeable odor and a more or less deep color. It has been said that these undesirable properties were to be avoided by the use of o-cresol in place of crude cresol. But with this process also a number of difficulties have to be overcome in the purification, as for instance the removal of the impurities, contact substances and the like by means of steam, the washing with organic solvents and the like. Furthermore in this case various contact means are required for carrying out the reaction and the resins obtained are by no means of a light color, but, on the contrary of a rather deep reddish color, because, as I have found, particularly the o-cresol is inclined to produce an intense pigment.

By a long comparative series of experiments I now have found, that the different cresols all have different reaction speeds, that the same for the m-cresol has an intensity which is five times as great as that for o- and p-cresols, and that, at the same time, the resins obtained from the m-cresol show excellent qualities as regards a light color, hardness and the absence of all odor. By these features it is made possible to condense m-cresol to resins with formaldehyde without any contact medium and within the shortest time.

The crude commercial carbolic acids or crude cresols of commerce may be used directly and will yield perfect resin products. For this purpose crude cresols containing m-cresol are condensed with a quantity of formaldehyde approximately corresponding to the content of m-cresol, and the condensation is allowed to go only so far, that the m-cresol contained in the mixture is bound. The phenols which are not bound in the reaction and the other volatile parts are then removed in a suitable manner, preferably by heating *in vacuo* while stirring. The recovered phenols may be easily employed for other purposes. For example, the crude carbolic acid is first purified by fractional distillation, by separating all components up to a boiling point of 198° cent. which consist of phenol and o-cresol, and the components with a boiling point of over 198° cent. which chiefly consist of m- and p-cresols, are then condensed with a quantity of formaldehyde approximately corresponding to the content of m-cresol. Thereby a still fusible resin is obtained, which is free from the cresols contained therein by distillation *in vacuo*. These unaltered cresols may then be further purified by one or the other of the known methods. I may also condense any cresol mixture containing m-cresol under consideration of the content of m-cresol, then remove the uncondensed cresols and finally effect the further purification of the o- and the p-cresol contained in the latter. For instance the o-cresol in this mixture may be converted into the sulfo-acid and the unchanged p-cresol then be separated therefrom in a known manner. In this way at the same time a new method for separating the cresols is given, which is of a very material importance.

In order to avoid that, in consequence of the high capability of reaction of the m-phenols the condensation leads immediately to non-fusible resins, it is advisable to use mixtures which do not contain a too high percentage of m-cresol or its homologues and to use a little less of formaldehyde than the content of m-cresol or its homologues would call for.

In place of formaldehyde, of course, also any substance splitting off formaldehyde may be used. Also other aldehydes are capable of producing resins with m-substituted cresols. Any contact medium, filling substances and the like may be added at will.

216 grams of crude cresol of a boiling point of 200–202° cent. with 60% m- and 40% p-cresol are heated with 30 grams trioxymethylene (or the corresponding quantity of aqueous formaldehyde) for 8 hours in a vessel with a return condenser within an oil bath of a temperature of 120°. The unused cresol is then expelled *in vacuo*. There will remain 126 grams of a resin of a pale yellow color and great hardness, the sintering or melting point of which lies at 130° cent. In linseed oil this resin is insoluble, but it is easily soluble in alcohol, acetone and in soda lye.

The recovered unused cresol does not contain more than 28% m-cresol. After a repeated resinification of this cresol mixture with ½ molecule formaldehyde a p-cresol with only 3% m-cresol may be obtained. If desirable also both resinifying processes may be combined.

Having now described my invention what I claim and desire to secure by Letters Patent of the United States is:

1. A process for producing artificial soluble and fusible resins from phenols and formaldehyde consisting in condensing a crude cresol containing m-cresol with a formaldehyde body in about such a quantity as the quantity of m-cresol contained in said mixture will call for, expelling the unused cresol from the obtained resin and recovering said cresol.

2. A process for producing artificial soluble and fusible resins from phenols and formalhedyde consisting in condensing a mixture of p-cresol and m-cresol with a formaldehyde body in about such a quantity as the quantity of m-cresol contained in said mixture will call for, expelling the unused cresol from the obtained resin and recovering said cresol.

In testimony whereof I have hereunto set my hand in presence of two subscribing witnesses.

LUDWIG BEREND.

Witnesses:
MORITZ WETZEL,
MARIA HAHN.